July 3, 1951

S. G. ISSERSTEDT 2,559,435

TACHYMETRIC SIGHT

Filed Oct. 11, 1946

INVENTOR
S. G. ISSERSTEDT
By: Fetherstonhaugh & Co.
ATT'YS

July 3, 1951  S. G. ISSERSTEDT  2,559,435
TACHYMETRIC SIGHT
Filed Oct. 11, 1946  2 Sheets-Sheet 2
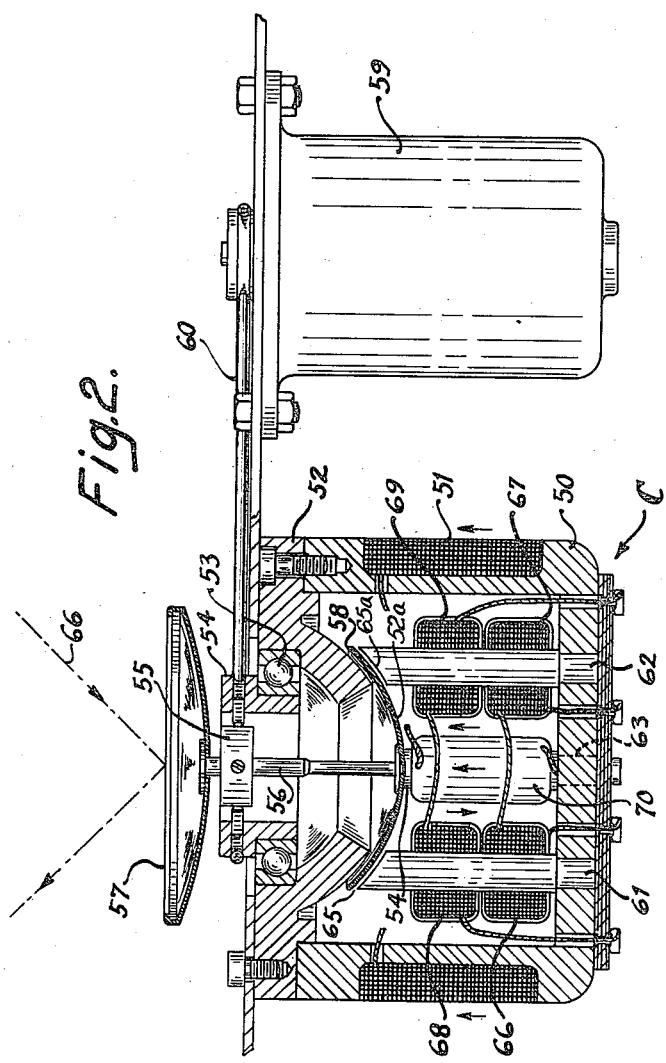
INVENTOR
S.G. ISSERSTEDT
By: Featherstonhaugh & Co.
ATT'YS Patented July 3, 1951

2,559,435

UNITED STATES PATENT OFFICE 2,559,435

TACHYMETRIC SIGHT

Siegfried Gordon Isserstedt, Toronto, Ontario, Canada, assignor to Corex Limited, Toronto, Ontario, Canada, a company of Ontario Application October 11, 1946, Serial No. 702,666

2 Claims. (Cl. 33—49)

This invention relates to tachymetric sights in which the sighting spot of the sight is corrected for range, relative speed of the target and, the effects of wind and temperature, on the flight of the projectile in order to give the gun the proper lead.

More particularly, however, the present invention relates to electrical gyro tachymetric sights, in which the desired deflections of the sighting spot are obtained through shifting the magnetic centre of the gyro by changing the current in the gyro control by novel attenuator means.

In this application the invention relates to a specific class of sight for guns in which a mirror is mounted on a gyroscopic device and will tend to be level at all times. A light source directs a beam toward the mirror and the same is reflected therefrom to fall onto a sighting plate having cross-hairs, and to illuminate this plate sufficiently to provide a sighting spot. The sighting plate is fixed in movement relative to the movement of the gun barrel as is the gyroscopic device and mirror. The gyroscopic device, however, includes means whereby the position of the mirror may be effected by various magnetic fields generated in various coils in conjunction with a magnet pot in known manner as regards the principles involved.

The attenuator used to vary the current in the gyro coils used in conventional computers consists of a series of rotary switches and fixed resistors. Thus, in order to obtain a current which varies with the relative direction of the wind to the gun barrel, four rotary switches are normally used which rotate with the gun position. But, in such a case, it is also necessary to rotate the external part of the rotary switch together with the fixed resistors according to wind direction and further, to bring leads from these switches to the mounting panel by means of slip rings and contact brushes. Hence, former attenuators are very complicated and have a limited number of adjustment steps. The conventional attenuator thus has certain inherent disadvantages as; maintenance of slip rings and contact brushes, a large number of attenuators each being made up of separate resistors placed in series to give step currents and thus limiting the accuracy to a fraction of the value of each resistor to the attenuator as a whole; and lastly the great number of manual adjustments which the gunner must make to compensate for wind direction.

With a view to overcoming such disadvantages, it is a primary object of the present invention to provide a combination of computer and tachymetric sight wherein all sighting adjustments are made automatically so that it is merely necessary for the gunner to keep the spotting sight on the target.

Another object of the present invention is to provide a computer capable of more accurate adjustment than prior types and which is less expensive to manufacture.

A further object of the invention is to provide a computer in which all resistors are stationary, thus eliminating slip rings and contact brushes.

A still further object of the present invention is to provide a computer in which one standard variable resistor replaces four separate attenuators in former mechanisms.

A still further object of the present invention is to provide a computer of the proposed type in which the electrical output may be changed without changing the electrical circuit.

With these and other objects in view the present invention generally comprises mechanical means operatively related with the movement of a cooperating gun barrel whereby the values of variable resistances are varied in an electrical circuit to change the currents flowing in the electrical circuit, thereby to provide a controllable disposition and strength of magnetic fields, an armature freely suspended in said fields and carrying a mirror to position a sighting spot, said mirror and armature being rotated for gyro effect, and regulation of said gyro effect by said fields; whereby said sighting spot is positioned relative to said gun in compensating manner to allow for wind direction and velocity, relative movement of the target, and the path of the projectile relative to the elevation of the gun.

The invention will be clearly understood by reference to the following detailed specification taken in conjunction with the accompanying drawings.

In the drawings:

Fig. 2 is a sectional view of the sight and more particularly the gyro unit which is regulated by electrical circuit relation with the device of Fig. 1, and further showing a motor which rotates the sight for gyro effect.

Figure 1:
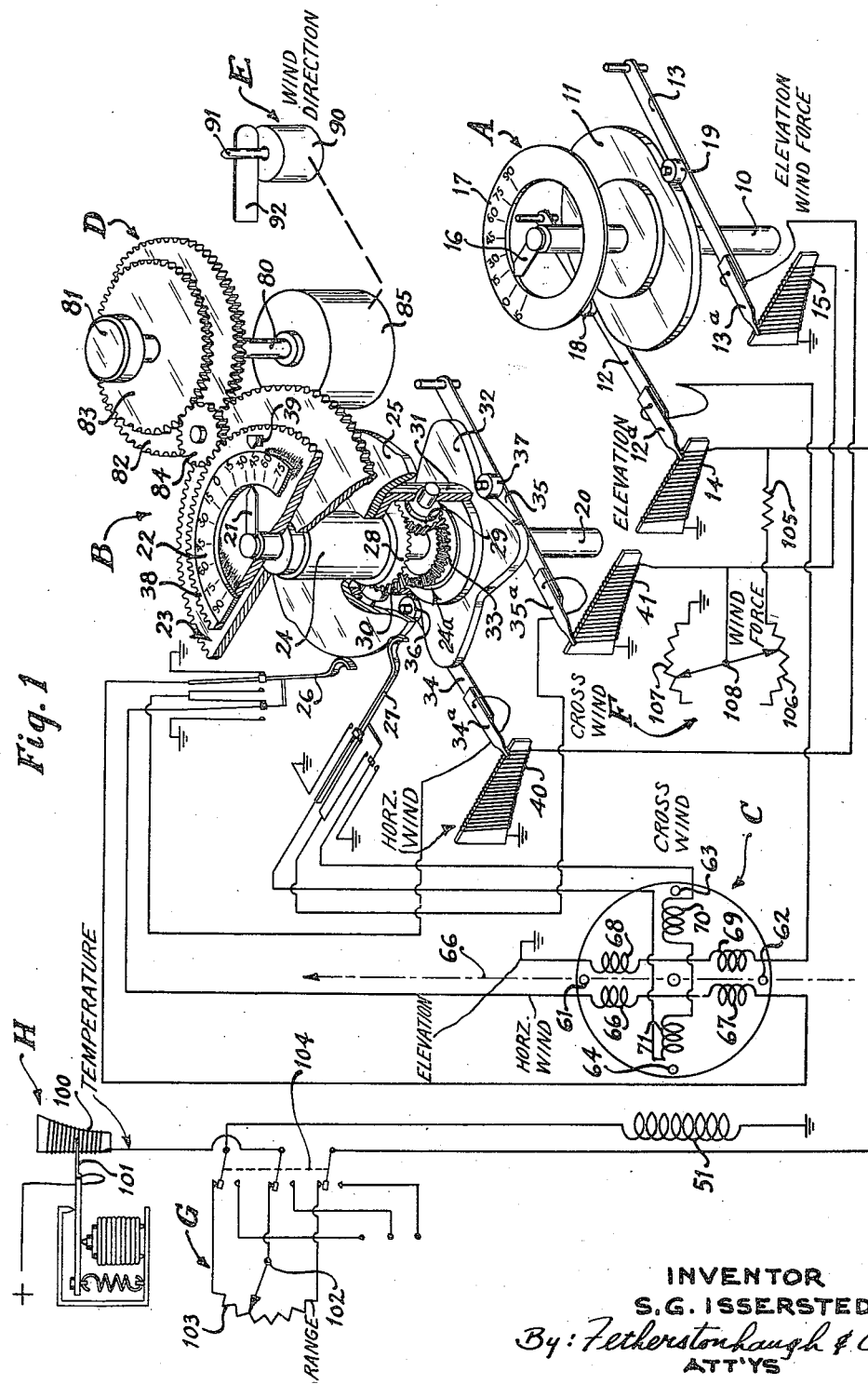
Fig. 1 is a schematic view of the proposed computer.

Referring to the drawings, it will be noted that the device is comprised of a number of units, some being independent and others being cooperative in nature. Generally, however, these units may be indicated with reference to their prime function as, an elevation compensating unit A, a horizontal compensating unit B, a gyro unit C, manual adjusting means D, remote transmission means or Selsyn system E, wind velocity adjustment F, range resistor G, and temperature compensating resistor H.

The unit A provides a means of gaining sufficient lead of the gun barrel over the sighting spot to compensate for the path of the projectile. However, it also governs the correction for wind to be applied by other units with respect to the elevation of the gun.

The unit B compensates for wind in all quadrants in the horizontal plane and provides the required lead of the gun barrel to the sighting spot or in some cases may provide an appropriate lag.

The unit C, irrespective of the other units, being attached to the gun, provides the proper lag in the sighting spot to compensate for movement of the target due to gyro effect. Units A and B qualify this condition and further enter their respective effects supplementary to the primary gyro effect in unit C.

Unit D provides adjustment of unit B by manual means for direction of wind.

Unit E is a remote Selsyn system which can govern unit D and thereby compensate for direction of the wind automatically.

The wind velocity resistor F governs the current in and hence the resultant effects of the units A and B and their contribution to the gyro unit C. The overall current attainable in the electrical circuit correcting for wind direction is thus qualified by manual adjustment of unit F and is thus governed thereby in this one respect.

The range resistor G controls the overall current flowing to the electrical circuit of the whole mechanism and qualifies the lag of the gyro unit by manual adjustment to compensate for range. The electrical circuit is governed by the resistor G in such a manner that at minimum range a maximum current flows in the electrical circuit and hence a minimum of lag, whereas at maximum range, very little current flows and a maximum of lag is provided. In order that this fundamental be absolutely clear, it is necessary to mention that the electrical circuit so mentioned here only refers to the range coil 51 so that when the current in range coil is a minimum, then by virtue of range resistor G the current available to units A and B must be a maximum. By the very nature of the corrections applied by units A and B, it must be so as will be evident in a moment of reflection.

Lastly, the unit H is a thermostat means of controlling a variable resistor which compensates for temperature changes in the mechanisms so described, by controlling the overall current supplied to all electrical circuits.

Mechanical characteristics

The unit A is comprised of a shaft 10 operatively related with the vertical movement or elevation of the gun. Appended to shaft 10 is a cam 11 being designed in its peripheral contour to regulate the sweep of cantilever arms 12 and 13 over tapered resistors 14 and 15 respectively, in a desired relation to the elevation of the gun, in order to compensate for relative movement of gun and target in the vertical plane and for the path of the projectile in the vertical plane. Arms 12 and 13 have sliders 12a and 13a which engage tapered resistors 14 and 15 to pick off resistances therefrom. On the upper extremity of shaft 10 and fixed thereto is an indicator 16 and a dial 17 fixed in relation to a bubble horizon. Rollers 18 and 19 provide smooth control of arms 12 and 13 by cam 11 and are mounted on said arms.

The unit B is comprised of shaft 20 which is mechanically related by suitable means (not shown) to the movement of the gun barrel so that the arc of horizontal sweep of the gun will be duplicated by corresponding rotation of the shaft 20. A dial 22 is mounted in fixed relation with respect to the zero bearing of the gun which, in the case of an installation of a gun on a seagoing vessel, would be the course of the vessel. The indicator 21 mounted on the upper extremity of shaft 20 at any time will indicate the bearing of the gun in its horizontal sweep relative to the course of the vessel. A gear 23 is appended to a bushing 24 which is mounted freely on shaft 20. The bushing 24 carries a cam 25 rotatably mounted thereon and having a contour engaging switch arms 26 and 27, the contour being designed to provide movement of said arms in predetermined relation with respect to the rotation of the bushing 24 by differential gear means 24a. Bushing 24 carries a gear 28 appended thereto which engages idler gears 29 and 30 of said idlers being mounted in a differential gear housing 31 connected to mounting cam 25 and cam 32. Gear 33 is fixed to shaft 20 and engages idler gears 29 and 30 to provide a differential assembly whereby, if the bushing 24 is held stationary and shaft 20 is rotated, the cams will be caused to rotate one-half the radial amount but in the same direction as the rotation of the shaft 20. Bushing 24 is held fixed by way of gear 23 to unit D and governed thereby according to the direction of the wind. The cam 32 is designed on its peripheral contour to position arms 34, 35 by bearing on rollers 36, 37 in a predetermined relation which is a function of the relative movement of gun and target and wind effects. Gear 38 merely carries an indicator 39 which points to the direction of the wind relative to the zero bearing of the gun on scale of dial 22 and for this function gear 38 must be freely mounted on shaft 20. The arms 34, 35 have sliders 34a and 35a which engage the tapered resistors 40 and 41 and pick off resistance values therefrom which are determined by the position of the arm in function above mentioned.

Unit C is shown in Fig. 2 and is the gyro unit of the sight of the gun. The gyro unit is comprised of an exterior casing 50 (Fig. 2) having a field coil 51 mounted thereon, said casing being termed "the magnet pot." This magnet pot has a cover 52 formed substantially as shown to accommodate a bearing 53 upon which a bushing 54 is mounted. The bushing 54 forms a universal carriage with the ring 55 for an armature rod 56 connected to a mirror 57 and having an aluminum dish armature 58 appended to its lower extremity. It is to be noted that a motor 59 rotates the bushing 54 by means of a belt 60 causing rotation of the armature assembly and gyro action thereby. Posts 61, 62, 63, 64 (Figs. 1 and 2) extend upwardly from the base of the magnet pot 50 to provide air gap 65 between their upper ends 65a and the downwardly depending portion 52a of the cover 52 and in which the dish armature 58 floats. Therefore, since the magnet pot, cover, and posts are made of similar flux conducting material, the intensity of the magnetic flux passing the gaps may be controlled by suitable energization of coils 66, 68 on post 61; 67, 69 on post 62; and coils 70 and 71 (Fig. 1) on posts 63 and 64 respectively. These coils are shown schematically in Fig. 1. The whole unit C is operatively related in the conventional manner, directly to the movement of the barrel of the gun and hence the mirror 57 due to its gyroscopic rotation will lag the travel of the barrel to compensate for relative movement of the target.

The unit D is an adjusting means comprised of a shaft 80 with a hand knob 81 mounted on its upper extremity. Gears 82 and 83 are fixed to shaft 80. Clockwise rotation of shaft 80, therefore, causes counterclockwise rotation of bushing 24 of unit B by intermeshing of gears 82 and 23, at the same time causing proportional clockwise rotation of gear 38 by intermeshing of gear 83 and gear 38 with an idler gear 84 mounted therebetween. At the lower extremity of shaft 80 is a receiver 85 which controls rotation of shaft 80 by remote control from unit E.

The unit E is a remote precisioning system such as a Selsyn. A transmitter 90 is operatively related with a shaft 91, said shaft having a wind vane 92 mounted thereon which is designed to point into the wind. Thus rotation of shaft 91 caused by the indicating or wind direction vane 92 will be automatically transmitted to shaft 80 of unit B by remote control by Selsyn system indicated by parts 85 and 90.

Electrical circuit

Considering the electrical circuit, it will be noticed that its function is to govern the magnetic flux existing in the gaps 65 to effect the positioning of the armature thereby. This is accomplished by changing resistance components in the circuit as previously described resulting in a change in the values of the currents in the coils of the magnet pot or unit C. The control of overall current in the circuit is provided by placing a variable resistor 100 in series by means of its wiper 101 with a constant source of voltage. The resistor 100 is thus introduced into the circuit to allow compensation for temperature. Current then flows from the temperature compensating resistor 100 to the wiper 102 of a variable range resistor 103, one end of said resistor being connected to the non-grounded end of the field coil 51 of the magnet pot. The other end of said range resistor is connected to the non-grounded end of resistor 14 of unit A. Alternatively, the circuit so shown may be incorporated in a radar circuit by means of a suitable switching mechanism 104. The current flows from the point of connection to resistor 14 also through a fixed voltage dropping resistor 105 through a wind force resistor assembly which is comprised of resistors 106 and 107 and a common wiper 108 connected to resistors 15 and 41 (being in parallel with respect to ground) and which distributes the current from these resistors between ground and the resistor 105 since resistor 107 is grounded at one end.

Energization of coils

As has been previously pointed out, the field coil 51 of the magnet pot may be energized by voltage drop through a temperature correction resistor and a range resistor or by radar tap as indicated.

The tangent elevation coils 68 and 69 are connected in series between ground and the slider 12a on the resistor 14. Thus the current derived for the operation of these coils will be determined by the operation of unit A.

The current through the horizontal wind coils 66 and 67 is varied by the unit A, the unit B, and changed in direction by the position of the switch arm 26 of the unit B. In this respect, the resistor 15 of unit A and the resistor 40 of unit B and the contour of cam 25 are involved.

The cross wind coils 70 and 71 are energized by current which is changed in direction and modified in magnitude by the unit B through the medium of cam 25 and tapered resistor 41. The value of current from resistor 41 further depends on adjustment wind force resistor assembly 108. It may also be noted that the current derived by virtue of wind force resistor assembly 108 is dependent upon unit A in tapered resistor 14 which is connected to the supply voltage as previously described. It is apparent, therefore, that the current in the cross wind coils 70 and 71 is both a function of unit A and unit B.

In respect to flux conditions, it is to be assumed that the coils are assembled in the magnet pot as formerly described, but are mounted so that the flux from coil 68 acts additively with coil 51 and either additively or otherwise with coil 66 depending on the direction of current flow in coil 66 and according to the action of the reversing switch 26 of unit B. Further, that the direction of flux from coils 69 and 67 is opposite to that existing in coils 68 and 66 at all times. Again that the coils 70 and 71 mounted on posts 63 and 64 respectively, are mounted in such a manner as to be opposed magnetically at all times with respect to one another but that the direction of magnetic flux achieved therefrom is dependent upon the direction of current flow determined by the reversing switch 27 of the unit B. Still again, that the coil 51 of the magnet pot 50 has current flowing therethrough as formerly described which causes flux thereby to be flowing always in the same direction.

The magnetic flux accruing from coil 51 is variable in magnitude according to the range by the range resistor 102. Coil 51 being the range coil makes compensation for range by damping or adding to the resultant flux of all the other coils depending upon the magnitude and direction of current flow in the latter. Thus, where the magnetic flux from coils 68 and 69 is dominant the coil 51 acts in a damping sense whereas if the magnetic flux in the coils 66 and 67 is dominant coil 51 will act in an additive sense. It will therefore be apparent that in some instances, the range coil 51 may generate sufficient flux to neutralize the effect of the other coils at one of the posts or even reverse the polarity of the post as established by the direction of current in the coil mounted thereon. At the same time, some of the other posts may have the resultant flux added to by the coil 51. The range coil 51 thus tends to neutralize the effect of the other coils and in this way causes a lagging in their effect by making resultant fields so weak as not to instantly position the dish 58 relative to the disposition of flux at the posts. Hence, the lag of the gyro unit is varied by the current in coil 51. When the range is short the current is large and the lag of the gyro is small and thus the gun will only point a small amount ahead of the target. If, however, the range is long, the current in coil 51 will be small and thus the gyro unit and the sighting spot will lag more and give the gun a greater lead.

Operation

In the following discussion, it will be assumed that the gun is working at sufficient range such that compensation must be made for the path of the projectile by adjustment of the range resistor 103 to ensure that the proper amount of current is flowing in the range coil 51, or that radar is supplying current thereto by way of switch 104, and further that the direction of flow of magnetic flux in the gaps 65 is from the cover 52 to the posts 61, 62, 63 and 64. Therefore, let it be assumed that each post is "South" at the working end or merely "S." Similarly the cover 52 will be "North" or "N." Considering the coils mounted as previously described, the following cases will first reveal the result derived from each component of the mechanism and then trace it back by way of magnetic, electrical, and mechanical operation to the adjustment of each unit by automatic means or otherwise according to its nature.

*Case 1.—Gun bearing zero, elevation zero, wind bearing zero (blowing from the gun to the target).*—Here the horizontal wind coils 66, 67 contribute nothing since no current is flowing through them. This is evident by noting that the source from which resistor 40 of unit B receives current is from resistor 15 of unit A and since slider 13a will be contacting to ground as shown, no current can pass through contact 34a to the horizontal wind coils. The cross wind coils 70, 71 contribute no flux to posts 63, 64 since they are supplied with current through a switch 27 by slider 35a which picks off voltage from resistor 41 and the slider 35a will be connecting to ground. Thus, in this case only the range coil 51 and tangent elevation coils 68 and 69 are relevant and unit A will be at zero, unit B will be adjusted to zero on the scale including indicator 39 and further unit E will be pointing in the direction of the wind on zero bearing.

*Case 2.—Gun bearing 90 degrees, elevation zero, wind bearing zero, with reference to zero bearing of gun as before.*—The tangent elevation coils 68, 69 on posts 61, 62 will not receive current due to the adjustment of unit A as before. The cross wind coils 70 and 71 on posts 63 and 64 will receive current of such direction that post 63 will have flux deducted therefrom and post 64 will have flux added. The direction of current flow is determined by the switch 27 and the cam 25 in operative relation by unit B with the bearing of the gun. The current is derived then from slider 35a which, however, in this instance rides at the upper end of the resistor 41 due to the gear relation between cams 25 and 32. The horizontal wind coils 66 and 67 will receive no current as before since the slider 13a will connect to the grounded end of resistor 15. Thus, in this condition where the cross wind is from the right, the mirror 57 will be dipped to the left to throw the sighting spot in that direction and provide the appropriate lead for the gun.

*Case 3.—Gun bearing 180°, other conditions remaining the same.*—The tangent elevation coils will be unaffected as before. The horizontal wind coils 66, 67 on posts 61, 62 will receive no current as previously. The cross wind coils 70 and 71 will receive no current by way of switch 27 since slider 35a will rest at the grounded end of resistor 41 due to position of cam 32. It is to be noted that due to positioning of arms 34 and 35 on cam 32, the current picked off by one of their cooperating sliders is a maximum where the current picked off the other is zero. This case is similar to Case 1.

*Case 4.—Gun bearing 270°, other conditions remaining the same.*—This is similar to Case 2 except that the direction of current in the cross wind coils is reversed since the wind is from the left here, and by virtue of cam 25 switch 26 will reverse the flow of current. The source of current in this respect is by way of slider 34a as per Case 2. Here the mirror will tip to the right causing the barrel to lead the sighting spot and compensate for cross wind thereby.

In all of the above cases where the elevation of the gun is zero it will be noted that the slider 12a rides at the upper end of the resistor 14 and receives current according to range as determined by the range resistor 103 which distributes the positive voltage between the coil 51 and the resistor 14 in accordance with the range adjustment. There is thus some effect in the tangent elevation coils which theoretically would be zero at zero range but in the practical sense this need not be provided for and for this reason the resistor 10 will at any adjustment of the range resistor receive some current which would be of negligible effect at short range.

*Case 5.—Gun bearing zero, elevation 90°, wind bearing zero.*—This differs from Case 1 in that the horizontal wind coils will receive current since slider 13a will no longer ride at the grounded end of resistor 15 but will be positioned thereon at a maximum point determined by the cam 11 of the unit A which is operatively related to the elevation of the gun barrel. The tangent elevation coils 68 and 69 receive no current since slider 12a connects to the grounded end of resistor 14 as determined by contour of cam 11. The horizontal wind coils 66, 67 will tend to change the magnetic polarity of the tops of post 61 to N and increase the S in post 62 in addition to the S polarity already on the ends of the posts by virtue of range coil 51. The tangent elevation coils 68 and 69 will contribute a maximum of N to post 61 and a maximum of S to post 62 respectively. The mirror 57 will then be tipped forward causing a lowering of the sighting spot and a leading of the barrel of the gun upward.

*Case 6.—Gun bearing 180°, other conditions same as Case 5.*—All conditions will be the same as Case 5 except the horizontal wind coils which will reverse polarity due to a change of direction of current by the changed position of switch 26 determined by contour of cam 24, thus tending to decrease the lead of the gun upwards of the sighting spot.

From a consideration of the foregoing examples and noting the effects mentioned, the results of the operation of the sight for any position of the gun can be clearly visualized.

*Case 7.—Gun bearing 45°, elevation 45°, wind direction zero.*—In this case the tangent elevation coils 68 and 69 will be effected according to the position of slider 12a which will be substantially midway along resistor 14, the latter being constructed according to a cosine function. The cross-wind coils 70 and 71 will be effected by the wind force resistors 106 and 107 governing voltage on resistor 41 which distributes its resistance according to a sine function and the slider 35a will pick off voltage for these coils. The horizontal wind coils 66 and 67 are dependent upon the voltage pick off resistor 15 by slider 15a which in turn feeds the resistor 40 where the slider 34a determines the current to be applied to the coils. The resistor 15 is formed according to a sine function, whereas the resistor 40 is formed according to a cosine function. The slider 13 acts to compensate for elevation wind force or variation with one force according to elevation whereas the slider 34a determines the amount of correction for the horizontal effect of the wind as regards the horizontal bearing of the gun relative to its zero bearing.

*Operation summary*

The tachymetric sight measures the relative rate of change of position between the target and the gun barrel position, and corrects the sighting spot to give the gun barrel a lead which is in proportion to the rate of change in position. The computer makes corrections for the range and adjusts the sighting spot to compensate for the effects of temperature and wind on the projectile.

When the gunner rotates the gun to keep the target on the sighting spot, or moves it up and down, this will affect the gyro unit, mounted on the gun, in a manner to move the sighting spot up or down, or right or left, in order to compensate for the range, the relative movement of the target, and the effects of wind and temperature on the flight of the projectile.

The lag of the gyro unit behind the position of the gun barrel is controlled by the strength of the range coil, which surrounds the magnet pot of the sight. When the range is short, the current through this coil will be large and the lag of the gyro unit will therefore be small. If the range is long, and therefore the shell is in the air for a longer time, the current through the range coil will be weak. Therefore, the gyro unit and sighting spot will lag behind the position of the gun barrel and, therefore, if the sighting spot is kept on the moving target, the gun barrel will be directed ahead of the target when the range is long. The sighting spot is deflected to compensate for wind conditions and tangent elevations in the following manner. The magnet pot of the gyro unit contains the coils described mounted at right angles around the centre thereof and by energization of these coils, the magnetic centre of the gyro unit may be changed and will thereby affect the position of the sighting spot.

By means of these coils, therefore, the sighting spot may be deflected either up or down, which affects the elevation of the gun barrel, or to the right or left which affects the bearing of the gun barrel, e. g. if the gun fires at right angles to the wind, a correction in the bearing of the gun barrel is required; whereas, if the gun barrel fires directly into the wind or with the wind, the direction of the bullet will not be affected by the wind and, therefore, no correction of the gyro unit is required. The computer makes these corrections automatically by energizing the coils in the magnet pot which tends to move the sighting spot to the right or left.

The large coil in the magnet pot which affects the lag of the gyro unit, and thereby the sighting spot, and which is affected by the range of the target only, has been referred to as the range coil. The coils in the magnet pot of the sight, the energizing of which causes the sighting spot to move to the right or left, are referred to as the cross wind coils. The coils which move the sighting spot up and down are referred to as the tangent elevation coils, and the horizontal wind coils.

It will thus be evident that the present computer comprises a comparatively simple device in contrast with former types and that it will not only be less bulky but due to its nature, will cut down the duties of the gun crew considerably by substituting automatic for many of the former manual adjustments. Further, the accuracy of the present computer is not limited to increments of the attenuators but only by the accuracy of the cam contours and lost motion in mechanical transmission, all of which is a minimum and probably of less consequence than the variables in the gun itself.

What I claim as my invention is:

1. In a sighting device for guns, having an illuminated movable sighting spot governed by the position of a mirror, including means for gyroscopically mounting the mirror in a magnet pot which is energized by a main electrical coil in a primary electrical circuit and including a plurality of coils in a secondary electrical circuit magnetically coupled with and designed to modify the magnetic field effects of the main coil on the gyroscopical mounting to correct the sighting spot, and wherein the plurality of coils are arranged in groups as cross-wind coils, horizontal wind coils, and tangent elevation coils; the combination comprising, means connecting said circuits in parallel between positive voltage and ground and including variable range resistor means for distributing positive voltage between the circuits according to range, a variable elevation wind force resistor having one end thereof connected to ground, means for applying a positive voltage to the other end of said resistor according to wind force, a slider on said elevation wind force resistor, cam means for actuating said slider in accordance with elevation to select a maximum voltage from said elevation wind force resistor when the elevation of the gun barrel is 90° and minimum voltage therefrom when the elevation of the gun barrel is zero, means operatively related to the gun barrel and providing movement of said slider over said elevation wind force resistor in accordance with the movement of said barrel, a variable horizontal wind resistor having one end connected to said slider and the other end connected to ground, a horizontal wind slider designed to pick off a maximum voltage from said horizontal wind resistor when the horizontal gun bearing is 0° or 180° and zero voltage therefrom when the horizontal bearing of the gun is 90° or 270°, double-pole double-throw switch means having a common pole connecting to said horizontal wind slider, and connecting the horizontal wind coils in series to ground, and means operatively related to the gun barrel for actuating the horizontal wind slider and said switch means in accordance with the horizontal bearing of the gun with regard to wind direction.

2. In a sighting device for guns, having an illuminated movable sighting spot governed by the position of a mirror, including means for gyroscopically mounting the mirror in a magnet pot which is energized by a main electrical coil in a primary electrical circuit and including a plurality of coils in a secondary electrical circuit magnetically coupled with and designed to modify the magnetic field effects of the main coil on the gyroscopical mounting to correct the sighting spot, and wherein the plurality of coils are arranged in groups as cross-wind coils, horizontal wind coils, and tangent elevation coils; the combination comprising, means in said secondary circuit for distributing electrical current to said plurality of coils in accordance with wind effects and comprising a shaft operatively related in its rotation with the horizontal sweep of the gun barrel, a bushing freely mounted on one end of said shaft, means for rotating said bushing in accordance with the direction of wind, a differential gear housing freely mounted on said bushing and said shaft and carrying a switching cam and a slider cam, differential idler gears mounted in said housing and extending inwardly thereof to engage a gear fixed to said bushing and a gear fixed to said shaft, double-pole double-throw switch means actuable by said switch cam and electrically connected to the cross-wind coils and the horizontal wind coils to determine the direction of current flow in the latter, a voltage source, horizontal wind resistor means and cross-wind resistor means connected electrically in parallel between the positive voltage of said source and ground, and slider arms connecting to said switch means and slidable over said resistors disposed to be actuated by said slider cam to vary the electrical current in said coils according to the bearing of the gun relative to the direction of wind.

SIEGFRIED GORDON ISSERSTEDT.

REFERENCES CITED

The following references are of record in the file of this patent:

UNITED STATES PATENTS

| Number | Name | Date |
|---|---|---|
| 389,265 | Thomson | Sept. 11, 1888 |
| 1,584,182 | Methlin | May 11, 1926 |
| 1,939,517 | Paulus et al. | Dec. 12, 1933 |
| 1,940,102 | Roberton | Dec. 19, 1933 |
| 1,984,874 | Gillmor et al. | Dec. 18, 1934 |
| 2,125,225 | Gourdou | July 26, 1938 |
| 2,264,487 | Smulski | Dec. 2, 1941 |
| 2,293,039 | Esval | Aug. 18, 1942 |
| 2,366,968 | Kaufman | Jan. 9, 1945 |
| 2,399,726 | Doyle et al. | May 7, 1946 |
| 2,417,425 | Lovell et al. | Mar. 18, 1947 |
| 2,439,381 | Darlington | Apr. 13, 1949 |
| 2,467,831 | Johnson | Apr. 19, 1949 |
| 2,538,253 | Lakatos et al. | Jan. 16, 1951 |

FOREIGN PATENTS

| Number | Country | Date |
|---|---|---|
| 574,704 | Great Britain | Jan. 17, 1946 |
| 578,958 | Great Britain | July 18, 1946 |